Sept. 29, 1970　　　　　G. MATTEUCCI　　　　　3,530,712
MACHINES FOR THE NOISE TESTING OF GEARS
Filed Oct. 31, 1968　　　　　　　　　　　　　　2 Sheets-Sheet 1
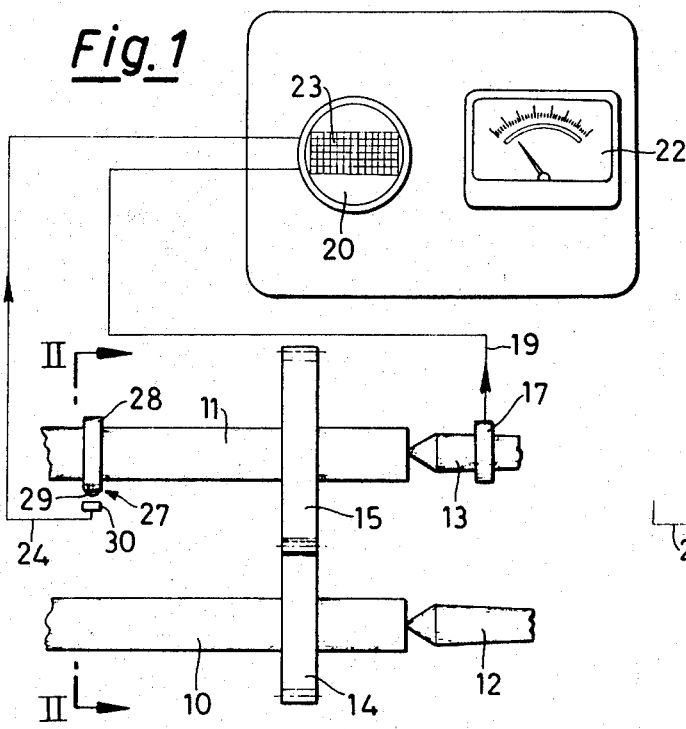
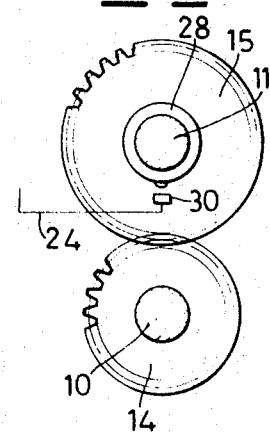
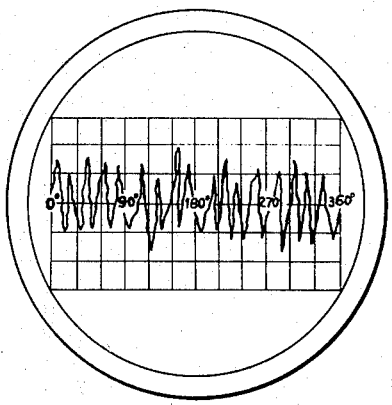

United States Patent Office 3,530,712
Patented Sept. 29, 1970

3,530,712
MACHINES FOR THE NOISE TESTING OF GEARS
Giampiero Matteucci, Porretta Terme, Bologna, Italy, assignor to S.p.A. Officine Meccaniche F.lli Daldi & Matteucci, Milan, Italy, an Italian company
Filed Oct. 31, 1968, Ser. No. 772,199
Claims priority, application Italy, May 22, 1968, 16,835/68
Int. Cl. G01m 13/02
U.S. Cl. 73—162     3 Claims

ABSTRACT OF THE DISCLOSURE

A device for detecting defects in gears by noise testing two gears of different diameters rotated in mesh with each other. The meshed gears are supported on spindles, one of which is driven in rotation. The spindles have piezoelectric vibration transducers connected to an oscilloscope, and a magnetic pad and pickup to synchronize the scan of each oscilloscope with the rotation of the corresponding spindle. Defects are indicated by a stationary peak on the oscilloscope corresponding to the gear having the defect.

---

This invention relates to machines for the noise testing of gears and in particular to an electronic device for checking and measuring the noise level of a pair of gear wheels.

It is well known that these machines are largely used for the testing of gears with the purpose of determining defects and imperfection in the gear wheels. These defects and imperfections give rise to noise connected with the mechanical vibrations produced by the pair of gear wheels when they are made to rotate in mesh. The principal disadvantage of this type of machine is that the evaluation of the noise is wholly empirical and is left to the ability and experience of the technician who superintends the machine.

A further drawback, equally important, arises from the fact that when the test shows that one or both the gear wheels contain an imperfection whose magnitude lies outside the foreseen tolerances, it is necessary to determine the exact position of the defect in order to provide for its elimination.

It is evident that in this way the operation becomes long and laborious in order to ensure positive results from the test, with the relative economic and operational disadvantages.

This invention eliminates the problems and disadvantages mentioned above by means of an electronic device capable of revealing in the form of an electronic signal, mechanical vibrations produced by a pair of gear wheels which rotate in mesh and to present them visibly in a form which furnishes both a quantitative indication of the magnitude of the imperfection and an indication of the position of the said imperfection.

In particular, the device according to the present invention in a machine for the testing of noise level of the type including a pair of spindles on which a pair of gear wheels being tested are keyed, one of the said spindles being made to rotate by means of a motor, includes at least one transducer coupled to one of the spindles and which senses the mechanical vibrations induced in the spindles by the rotation of the pair of gear wheels in mesh and transforms them into an electronic signal, means for presentation which receive the said signal and present it in the form of an oscillogram such as to allow the observation of the state of the noise and means for measuring the noise level, or preferably of the average intensity of the noise.

As will become clear during the course of the description of a preferred embodiment of the present invention, which is purely for example purposes and not limitative, the said mechanical vibrations which are sensed by the transducer and transferred to the means of presentation in the form of an electronic signal, are presented on an oscilloscope and from the corresponding oscillogram it is possible to derive the indications which serve for the discovery of the cause of the noise.

The principal advantage of the device according to the invention lies in the fact that once the calibration of the device has been carried out with a sample pair of gear wheels, tolerances can be fixed which can be evaluated quantitatively on a graduated scale and hence establish an objective criterion for the evaluation of the pair of gear wheels submitted to the test.

A further important advantage is that by coupling up two transducers, one for each spindle, and connecting two oscilloscopes to the apparatus, it is possible by observing the oscillograms easily to determine rapidly and with precision the location of a defect which causes the noise.

In the accompanying drawings:

FIG. 1 is a schematic representation of the device according to the present invention applied to a conventional machine for testing the noise level of gears;

FIG. 2 is a detailed sectional view taken along line II—II of FIG. 1;

FIG. 3 is a view of an oscillogram generated by a pair of gear wheels;

Figure 4:
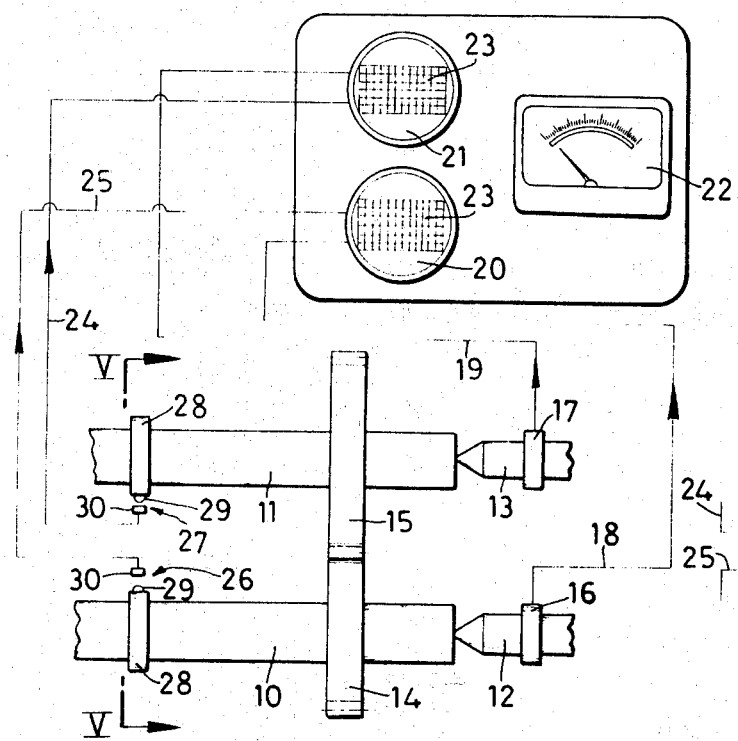
FIG. 4 is a schematic representation of the device of the present invention equipped with two oscilloscopes able to reveal the position of a localized imperfection.

FIGS. 1 and 2 show part of a conventional machine for testing noise, i.e. the pair of spindles 10 and 11 resting at one end against the centers 12 and 13. One of the spindles is made to rotate by a motor (not shown) and a pair of gear wheels 14 and 15 are in mesh and keyed on the spindles.

On the center 13 a transducer 17 is mounted which is able to sense the mechanical vibrations of the centre during the rotation of two gear wheels 14 and 15 in mesh, and to transform the vibrations into an electric signal which feeds an oscilloscope 20 through the conductor 19 and then a quantitative indicating instrument 22 having a scale suitably graduated and calibrated.

The oscilloscope 20 is of the conventional and well known type in its field and therefore will not be described in any greater detail other than to say that it contains a graduated scale 23 in which the abscissa indicates the angle of rotation of the corresponding gear wheel and the ordinate indicates the intensity of the vibrations.

As is usual in these devices, the time base for each oscillogram is given by a signal fed from a conductor 24 and having its origin in an electromagnetic synchronizer 27. This latter consists in practice of a ring of non-magnetic material 28 on which a pad of magnetic material 29, such as a granule of iron, is fixed, and which is disposed in the magnetic field of a magnetic detector 30. It is clear that each time the pad 29 passes in front of the detector 30, the magnetic flux linked to this latter varies and an electric signal is generated which in practice initiates the oscillogram.

The apparatus as it has been described offers the possibility of checking for each group of gear wheels under test the average intensity of the noise by observing the graduated scale of the quantitative indicating instrument 22, and also the state of the noise by observing the form of the oscillogram.

Considering now FIG. 3, this shows a typical oscillogram for a pair of gear wheels whose imperfection is extended over all or nearly all the teeth of the pair.

Figure 6:
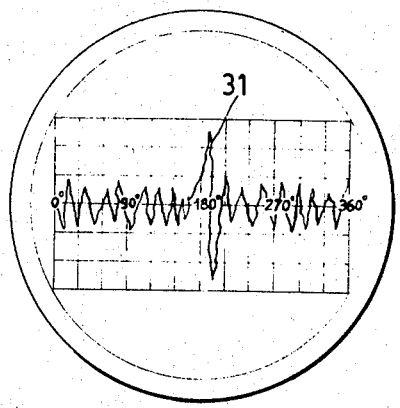
FIG. 6 is a view of an oscillogram generated by a pair of gear wheels, one of which has a local and revealable imperfection.

If on the other hand the oscillogram has the typical form shown in FIG. 6, the indication derived from this is that the pair of gear wheels contains one well localized defect which is revealed as indicated by the peak 31 of the oscillogram.

In the manufacture of gear wheels, this case presents itself very frequently and since it is necessary to provide for the examination of all the teeth of the pair in order to eliminate the defect, the machine can be equipped as shown in the arrangement in FIG. 4, for the purpose of avoiding the time necessary for this laborious operation, in which the device according to the invention is served by two oscilloscopes which render it possible to reveal both the gear wheel which contains the imperfection and the position of the imperfection itself.

Figure 5:
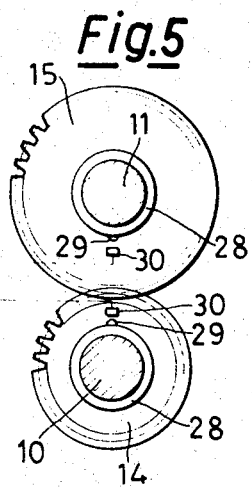
FIG. 5 is a detailed sectional view taken along the line V—V of FIG. 4.

In FIGS. 4 and 5, the pair of spindles are indicated by 10 and 11, the two centers by 12 and 13, the pair of gear wheels under test by 14 and 15, the two transducers by 16 and 17, the two conductors connected to the transducers by 18 and 19, the two oscilloscopes by 20 and 21, the instrument for quantitatively indicating the average intensity of the noise by 22, the graduated scale of the two oscilloscopes by 23, the two conductors of the two magnetic detectors 30 by 24 and 25, the rings of nonmagnetic material of the electromagnetic synchronizers 26 and 27 by 28, and the two pads of magnetic material of the electromagnetic synchronizers by 29.

For the investigation of the defect one proceeds in the following manner: Since the luminous oscillogram which is observed on the screen is an image which is reproduced for each rotation of the gear wheel to which it refers, and since the initial point of the oscillogram is controlled by the electromagnetic synchronizer which is itself linked with the gear wheel, it follows that on observing the two oscillograms it will be noted that in one the peak formed by the possible defect will remain stationary along the horizontal axis, while on the other it will move continuously along the horizontal axis of the oscillogram. This is due to the fact that the two gear wheels have a different diameter and it can be deduced that the gear wheel containing the defect is that in which the peak maintains an invariable position with respect to the axis of the abscissa. In fact as the oscillogram is synchronized with the rotation of the gear wheel, the defect always maintains the same angular position with respect to the electromagnetic synchronizer which gives the initial point of the oscillogram. However on the other gear wheel because of the difference in diameter, the position of the peak, which is originated when the defect coincides with the point of mesh of the two gear wheels, varies with respect to the relative electromagnetic synchronizer, for which the abscissa of the peak varies for each turn, Finally with the help of the graduated scale on the oscillogram in which the position of the peak remains constant it is possible to determine the angular position of the defect with respect to the origin, rather to the relative electromagnetic synchronizer.

It is worth while at this point to observe that in order to facilitate and unify the tests it is advisable at the beginning of each test to arrange for the iron pads 29 in the position shown in FIG. 5 in relation to the detectors 30.

Finally the graduated scale 22 indicates the averages noise level and since this can be calibrated for the test pair, it furnishes a true measure of the noise able to indicate instantly for each pair under test if the average noise level is higher or lower than that of the sample test pair and if it is contained within the required limits.

It is to be understood that the invention has been described in relation to a preferred embodiment, but that numerous modifications which are operationally equivalent are possible without departing from the invention.

What is claimed is:

1. A device for checking and measuring the noise level of a pair of meshed gears having different diameters, said device comprising a pair of spindles supporting the gears in mesh, one of said spindles being driven in rotation, first and second vibration transducer means operatively positioned to sense vibration of a respective gear and to transform the vibrations into electrical signals, and two oscilloscopes connected to respective ones of said transducer means to visually represent the vibration of an associated gear along an axis as a function of the angular position of such gear with respect to a predetermined orientation thereof, one oscilloscope displaying a peak which is fixed along said axis thereof when the associated gear undergoes periodic vibration in each revolution due to a defect therein, whereas the other oscilloscope displays a peak which travels along the axis thereof due to the irregular vibration thereof in each revolution as a consequence of the different diameters of the gears.

2. A device as claimed in claim 1 wherein each said transducer means comprises a piezoelectric transducer.

3. A device as claimed in claim 1 comprising electromagnetic synchronization means coupled with said spindles and said oscilloscopes for establishing said predetermined orientation of said gears.

References Cited

UNITED STATES PATENTS 2,044,955  6/1936  Rovick _____ 73—162 XR

FOREIGN PATENTS 945,777  1/1964  Great Britain.

LOUIS R. PRINCE, Primary Examiner

F. SHOON, Assistant Examiner